Figure 1:
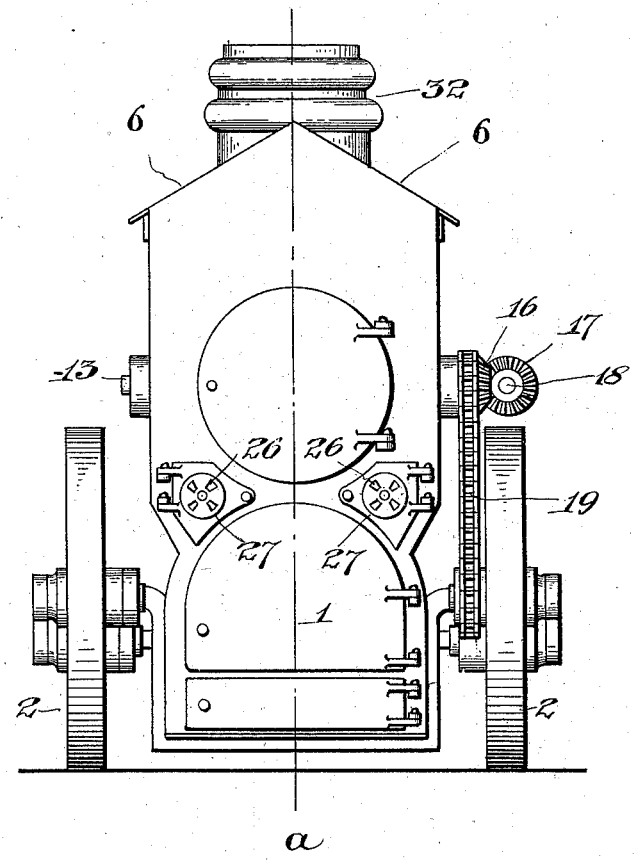

(No Model.) 5 Sheets—Sheet 1.
O. D. McCLELLAN.
APPARATUS FOR CREMATING GARBAGE, &c.

No. 558,976. Patented Apr. 28, 1896.

Witnesses.
Jesse B. Heller
Ira S Heller

Inventor.
Oscar D. McClellan,
per John F. Nolan
Attorney.

(No Model.)   5 Sheets—Sheet 2.
O. D. McCLELLAN.
APPARATUS FOR CREMATING GARBAGE, &c.
No. 558,976.   Patented Apr. 28, 1896.
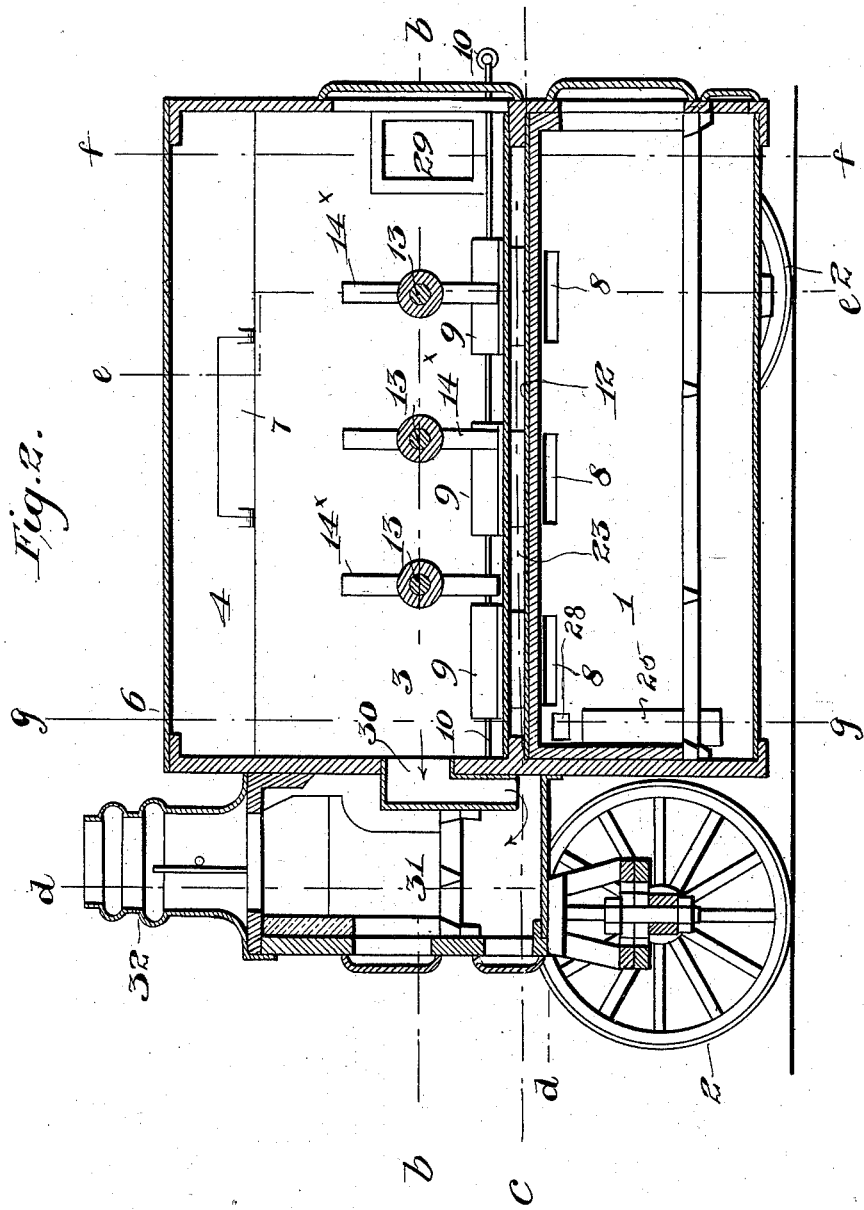
Witnesses.
Jesse B. Heller,
Ora S Heller
Inventor.
Oscar D. McClellan
per John F. Nolan
Attorney.

(No Model.) 5 Sheets—Sheet 3.
O. D. McCLELLAN.
APPARATUS FOR CREMATING GARBAGE, &c.
No. 558,976. Patented Apr. 28, 1896.
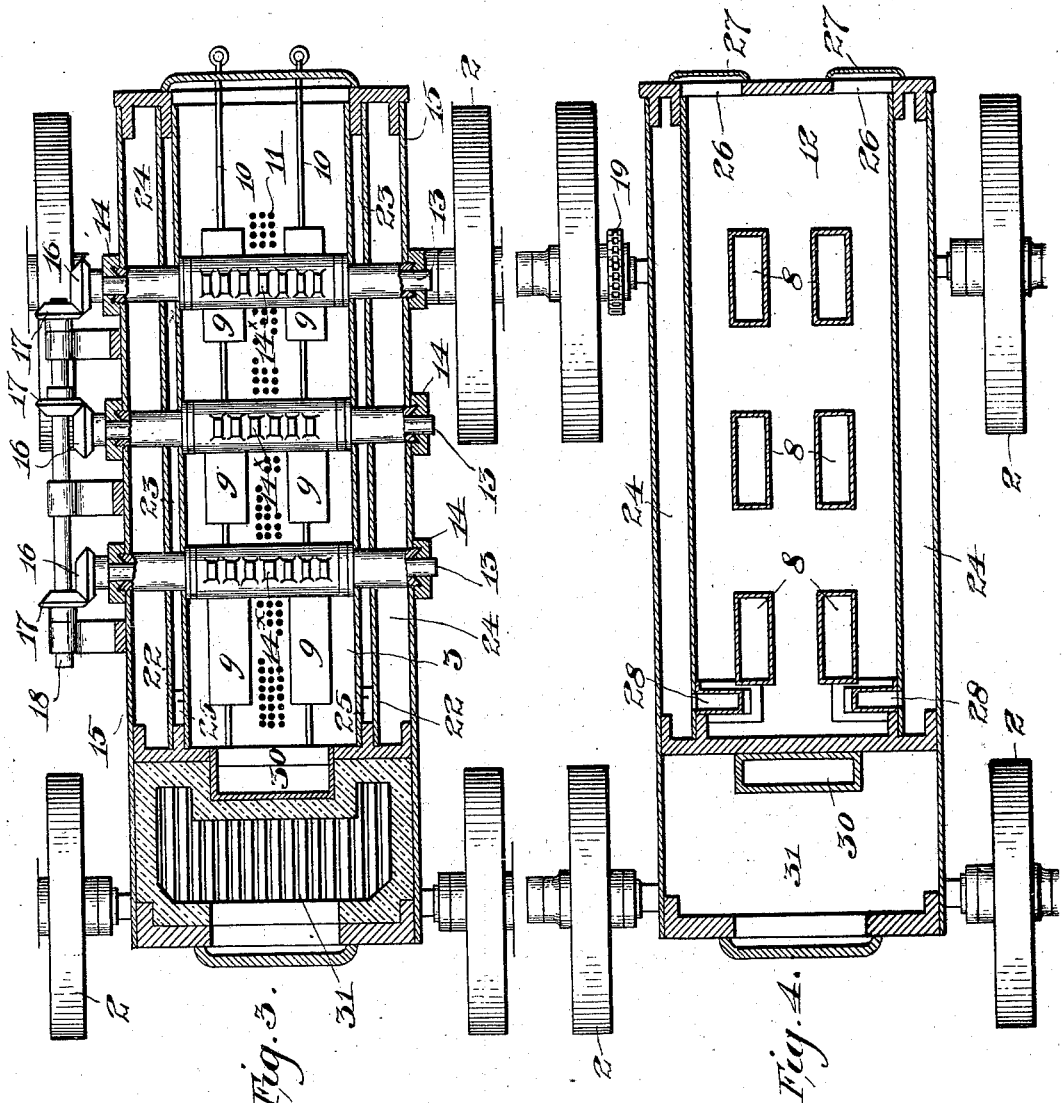
Witnesses.
Jesse B. Heller
Ira S. Heller
Inventor.
Oscar D. McClellan
per John R. Nolan
Attorney.

(No Model.) 5 Sheets—Sheet 4.
O. D. McCLELLAN.
APPARATUS FOR CREMATING GARBAGE, &c.
No. 558,976. Patented Apr. 28, 1896.
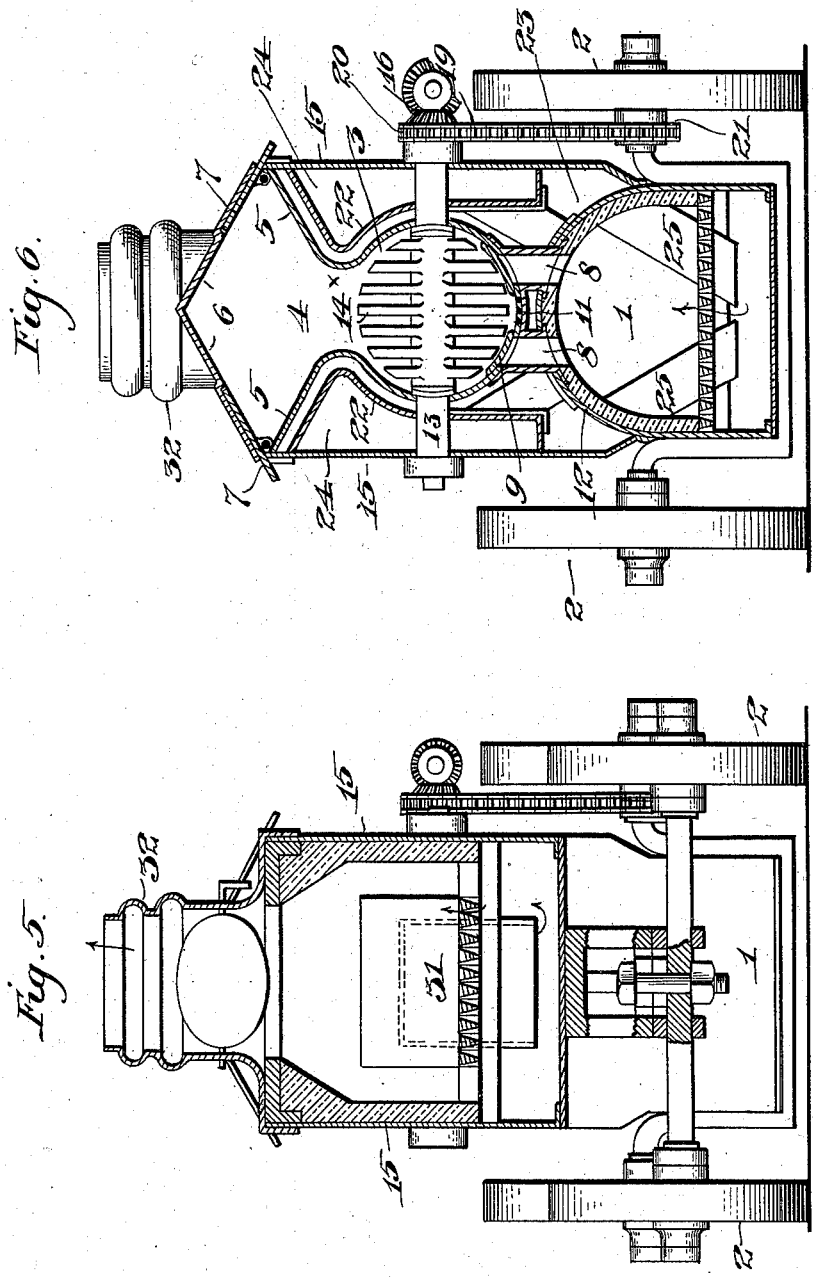
Witnesses. Inventor.

(No Model.) 5 Sheets—Sheet 5.
O. D. McCLELLAN.
APPARATUS FOR CREMATING GARBAGE, &c.
No. 558,976. Patented Apr. 28, 1896.
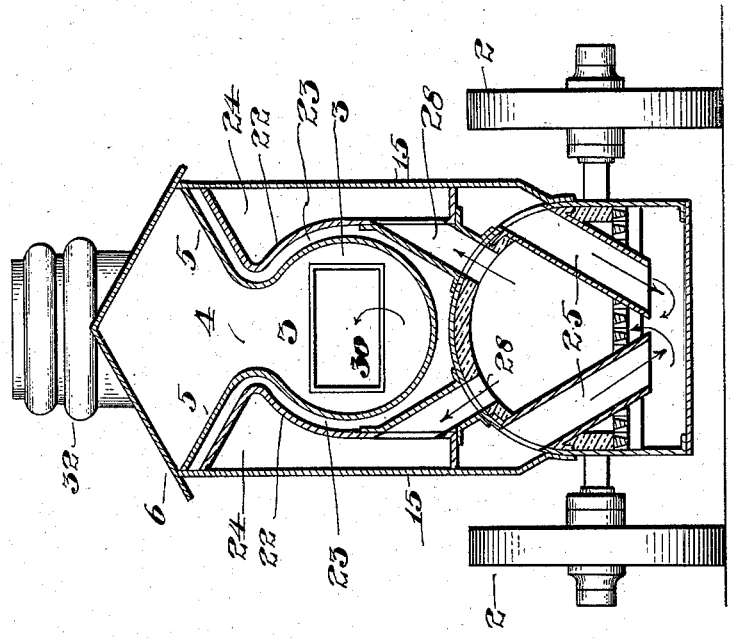
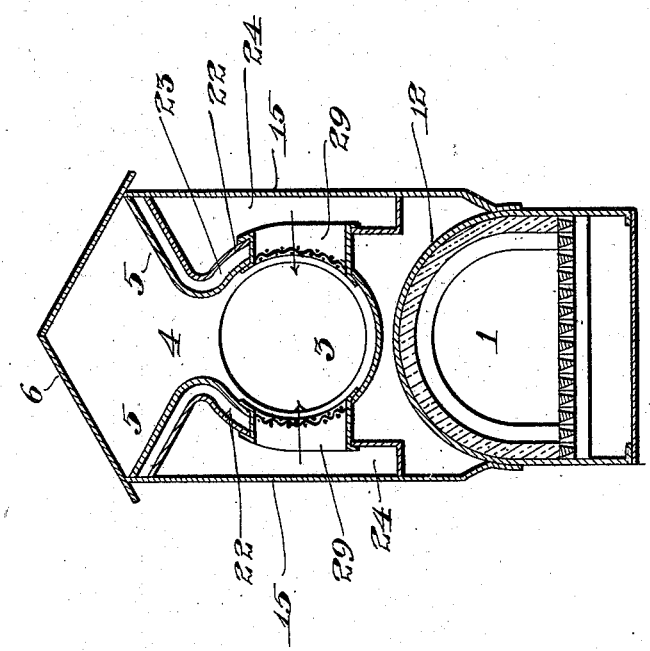
Witnesses.
Jesse B. Heller
Ira S Heller
Inventor.
Oscar D. McClellan,
per John F. Nolan
Attorney.

UNITED STATES PATENT OFFICE.

OSCAR D. McCLELLAN, OF PHILADELPHIA, PENNSYLVANIA, ASSIGNOR TO HIMSELF, FRANCIS DOUGHERTY, AND JOHN HAND PARKE, OF SAME PLACE.

APPARATUS FOR CREMATING GARBAGE, &c.

SPECIFICATION forming part of Letters Patent No. 558,976, dated April 28, 1896.

Application filed October 11, 1894. Serial No. 525,546. (No model.)

*To all whom it may concern:*

Be it known that I, OSCAR D. MCCLELLAN, a citizen of the United States, residing in the city and county of Philadelphia and State of Pennsylvania, have invented certain new and useful Improvements in Apparatus for Cremating Garbage, &c., of which the following is a full, clear, and exact description, reference being had to the accompanying drawings, forming a part of this specification.

This invention relates to that class of apparatus for cremating garbage, &c., wherein the substance is introduced to a receiver, dried therein, and then discharged into a combustion-chamber, as illustrated in my pending applications for Letters Patent—viz., Serial No. 482,264, filed August 3, 1893; Serial No. 515,240, filed June 21, 1894, and Serial No. 517,972, filed July 19, 1894.

My object herein is, primarily, to provide a construction whereby the substance and the noxious gases and products of combustion arising from the treatment of the substance shall be most effectually destroyed; and to this end the invention embraces novel features of construction and organization of parts that will be hereinafter described and claimed.

Referring to the annexed drawings, Figure 1 is a rear end view of the apparatus. Fig. 2 is a longitudinal vertical section thereof, as on the line $a$ $a$, Fig. 1. Figs. 3 and 4 are longitudinal horizontal sections, as on the lines $b$ $b$ and $c$ $c$, respectively, of Fig. 1. Figs. 5 and 6 are transverse vertical sections, as on the lines $d$ $d$ and $e$ $e$, respectively, of Fig. 2. Figs. 7 and 8 are transverse vertical sections, as on the lines $f$ $f$ and $g$ $g$, respectively, of Fig. 2.

The numeral 1 denotes a furnace structure mounted upon suitable carrying-wheels 2, whereby it may be drawn from place to place. Extending longitudinally above the furnace is a cylindrical receiver 3, the top of which is provided lengthwise thereof with an inlet 4, having outwardly-flaring sides 5 similar to a hopper, whereby the material deposited upon one or both of said sides shall be directed into the receiver. The inlet is arched by a covering-plate 6, which is provided at suitable points throughout its length with spring-controlled hinged doors 7. These doors are constructed to swing inwardly, so that when they are opened the substance may be readily introduced to the inlet, whereupon the doors will close automatically and prevent the exhalations from the contents of the receiver.

The bottom of the receiver is provided at intervals with openings 8, that communicate with the furnace-chamber. These openings are each provided with a slide-door 9, the several doors in alinement being connected by means of rods 10, one end of each of which extends outwardly through the head of the receiver, whereby by the act of manipulating said projecting end the connected doors may be slid off and upon the openings at will.

The bottom of the receiver is foraminated, as at 11, to the end that when the refuse is introduced thereto the liquid matter will descend upon the crown-plate 12 of the furnace and be thereupon vaporized and carried off, as hereinafter described.

Extending transversely through the receiver, at suitable intervals apart, are shafts 13, the ends of which are journaled in suitable boxes 14 in the vertical incasing side plates 15. The adjacent ends of these shafts, respectively, are extended beyond one of the plates, and they are provided with bevel gear-wheels 16, which engage with similar wheels 17 on an exteriorly-mounted longitudinal shaft 18. This latter shaft is geared with one of the carrying-wheels by means of a sprocket-chain 19 passing around sprocket-wheels 20 21 on said shaft and the hub of the carrying-wheel, respectively, to the end that during the traverse of the apparatus the shaft 17 and, perforce, the several shafts 13, will be rotated. The bevel-wheels are so disposed that the adjacent shafts 13 will be driven in opposite directions. On each of the shafts 13 is a series of radially-extending arms $14^\times$, the function of which, during their rotation, is to break up and agitate the refuse within the receiver.

The contained matter is thoroughly dried within the receiver, and it is then discharged by way of the openings 8 into the furnace-chamber wherein it is consumed. Exteriorly of the sides of the receiver are arranged longitudinal plates 22, the top and bottom edges of which are bent outwardly and secured to the side plates. There are thus formed between the receiver the plates and the arch of the furnace a longitudinal chamber 23, and between said plates and the respective side plates 15 longitudinal chambers 24.

At the forward part of the machine the chamber 23 communicates with the ash-box beneath the grate-bars by way of the downwardly-directed chutes 25, and at the rear of the machine said chamber 23 communicates with the open air by means of openings 26, which are provided with suitable doors 27. The combustion-chamber communicates by way of chutes 28 with the lateral chambers 24, and the latter, in turn, communicate with the receiver by way of the conduits 29. This receiver communicates at its forward end by means of a conduit 30 with the ash-box of a supplemental furnace-chamber 31, and the latter, in turn, communicates with the open air by way of a smoke-stack 32.

By the foregoing described construction it will be seen that the air enters the chamber 23, being heated therein and commingled with the gases arising from the vaporized liquid matter hereinbefore mentioned. Thence the combined gases traverse the chamber and enter the ash-box, passing therefrom into the combustion-chamber to aid in the combustion of the contained fuel, &c. The products of combustion from the furnace enter the lateral chambers, traverse the same and pass into the receiver, thereby aiding in the drying of the contents of the latter and carrying off to the supplemental fire-chamber the noxious gases arising from the contents of the receiver. The furnace last named finally consumes the gases that pass thereto, and in consequence prevents their escape to the atmosphere.

By directing the air in the tortuously-disposed passages, as above described, a strong draft is created not only for the main but for the supplementary fire, and consequently the fuel therein is maintained in a high state of incandescence to effect the result in view—to wit, the effectual destruction of the garbage and the gases evolved therefrom.

I claim as my invention—

1. In an apparatus for cremating garbage, &c., the combination of the furnace, and the longitudinally-disposed receiver provided with openings therein communicating with the interior of the furnace, and with perforations leading to the arch or crown of the furnace, together with gates for said openings, means for operating the gates and means for allowing the escape of the vapors generated upon the arch or crown of the furnace, substantially as described.

2. The combination of the furnace, the receiver communicating therewith, the chamber exteriorly of said receiver and communicating with the latter, the laterally-disposed chambers, and conduits or passages connecting the receiver with the lateral chambers, and also connecting the lateral chambers and the first-named chamber with the furnace, substantially as described.

3. The combination of the furnace, the receiver communicating therewith, the chamber exteriorly of said receiver and communicating with the latter, the laterally-disposed chambers, and conduits or passages connecting the receiver with the lateral chambers, and also connecting the lateral chambers and the first-named chamber with the furnace, together with the supplemental furnace communicating with the receiver, substantially as described.

In testimony whereof I have hereunto affixed my signature in the presence of two subscribing witnesses.

OSCAR D. McCLELLAN.

Witnesses:
JESSE B. HELLER,
JOHN R. NOLAN.